March 21, 1967 C. HAUSEN ET AL 3,310,142
AUTOMATIC CAP EJECTOR
Filed Oct. 22, 1965 3 Sheets-Sheet 1
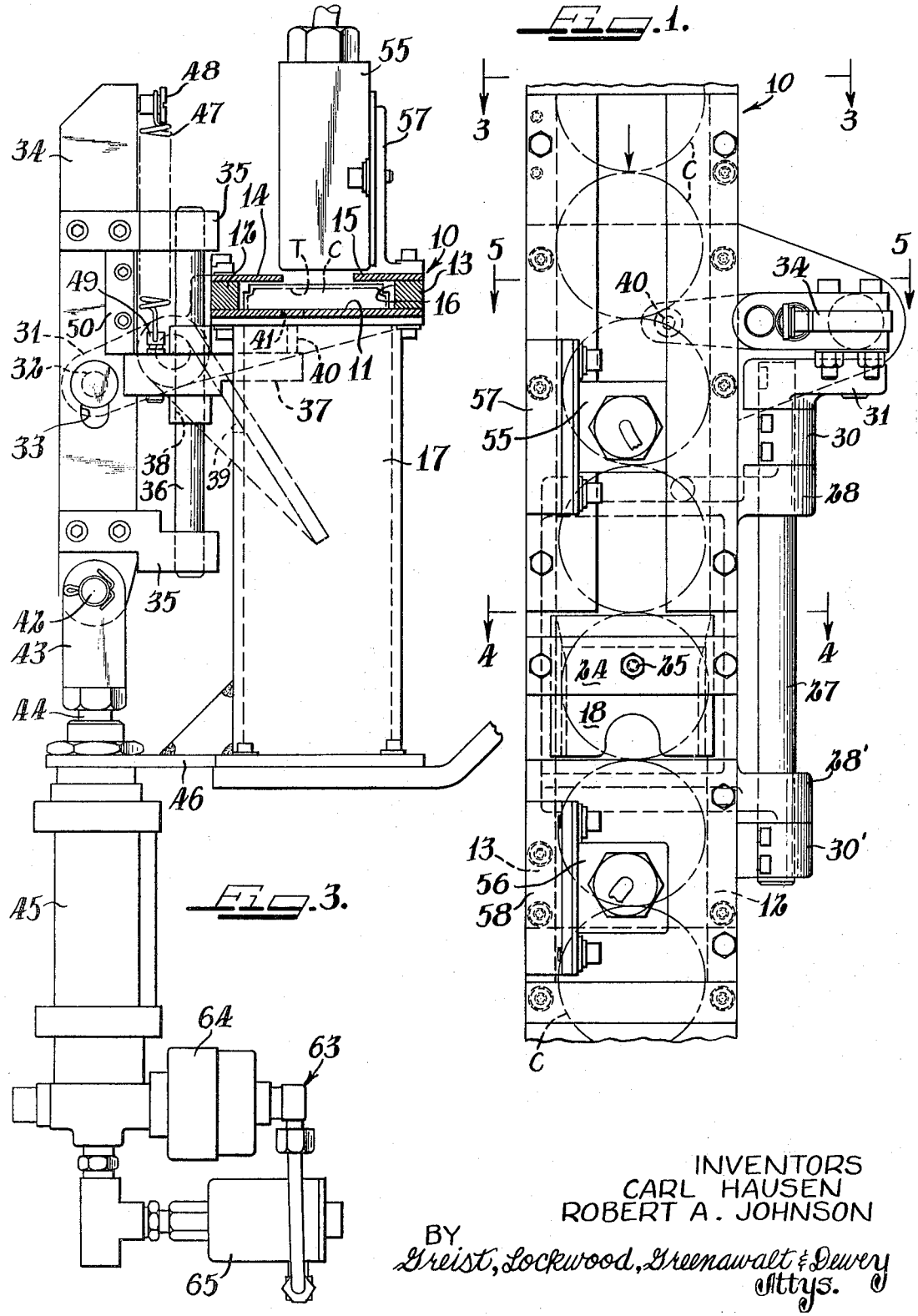
INVENTORS
CARL HAUSEN
ROBERT A. JOHNSON
BY Greist, Lockwood, Greenawalt & Dewey
Attys.

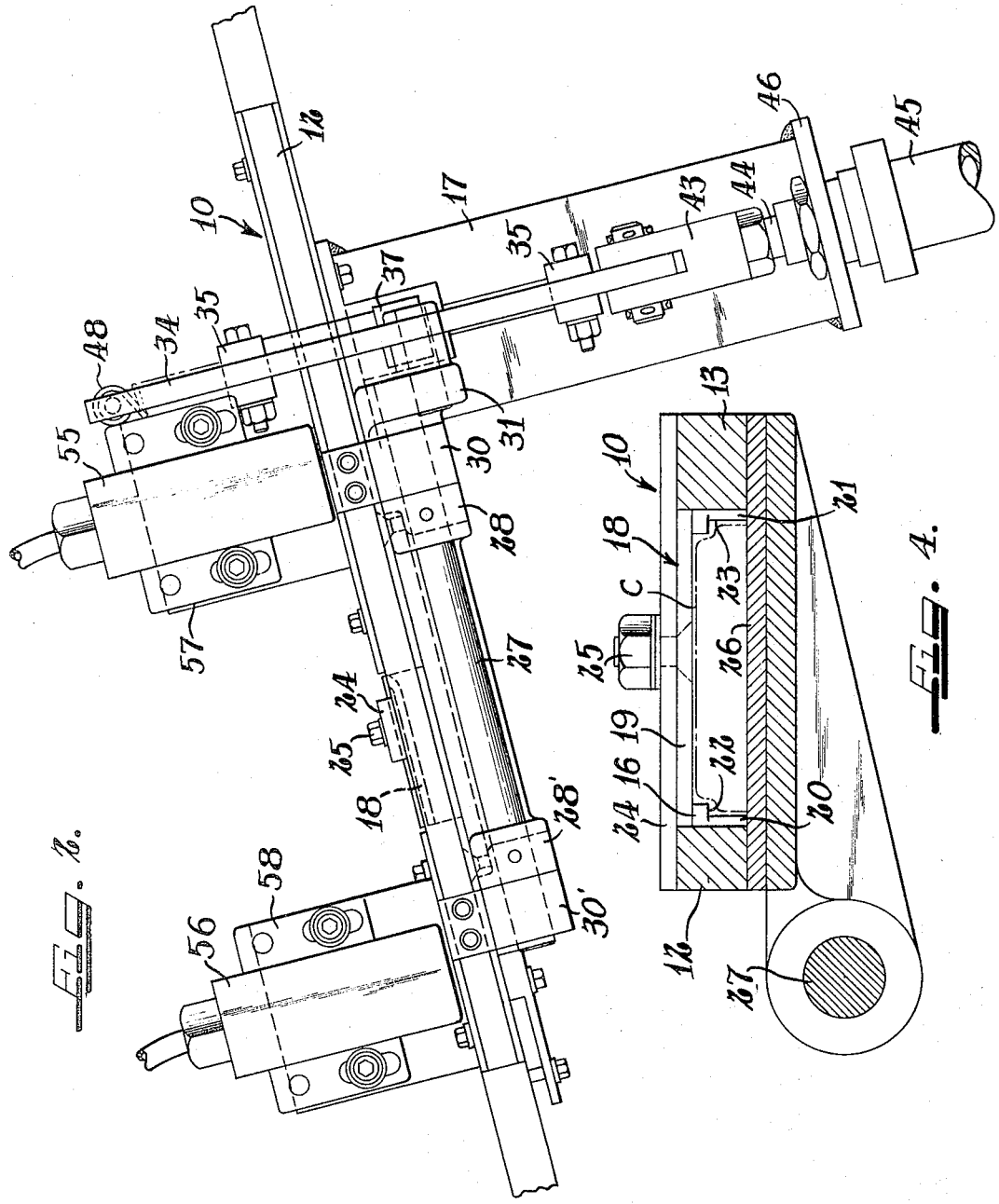

March 21, 1967  C. HAUSEN ET AL  3,310,142
AUTOMATIC CAP EJECTOR
Filed Oct. 22, 1965  3 Sheets-Sheet 3
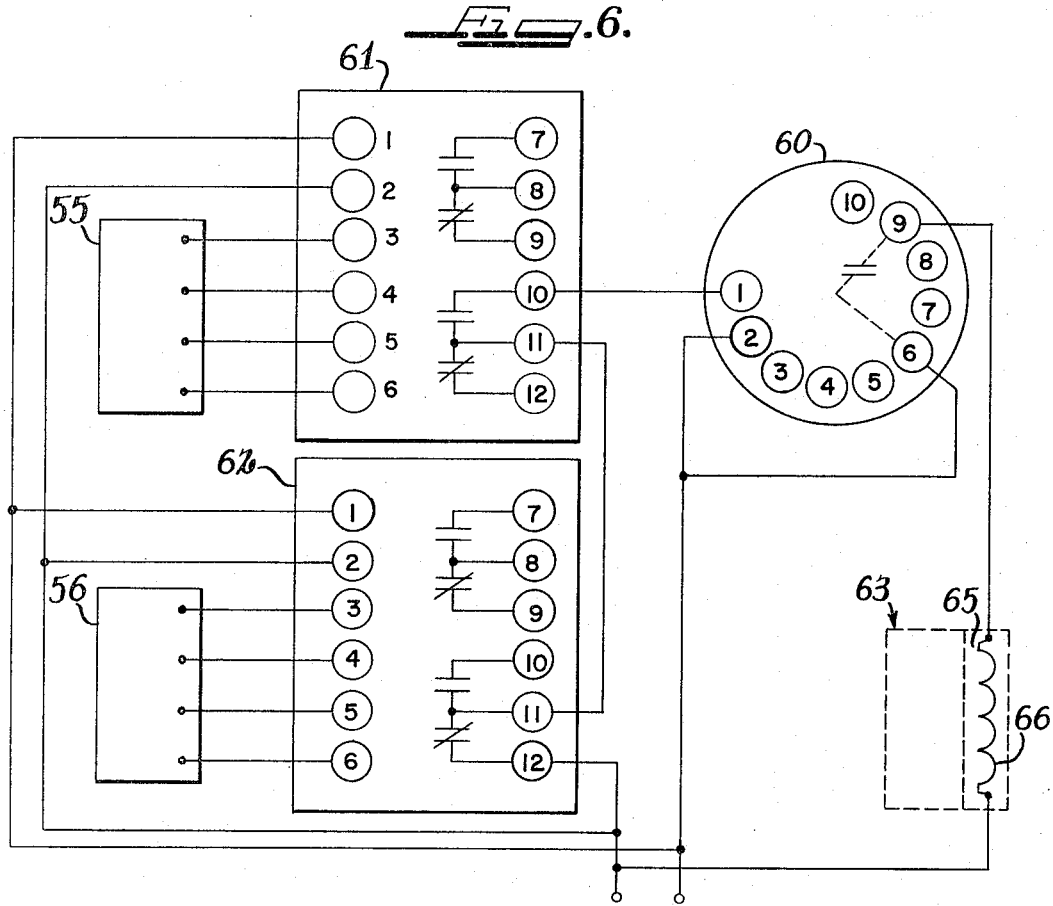
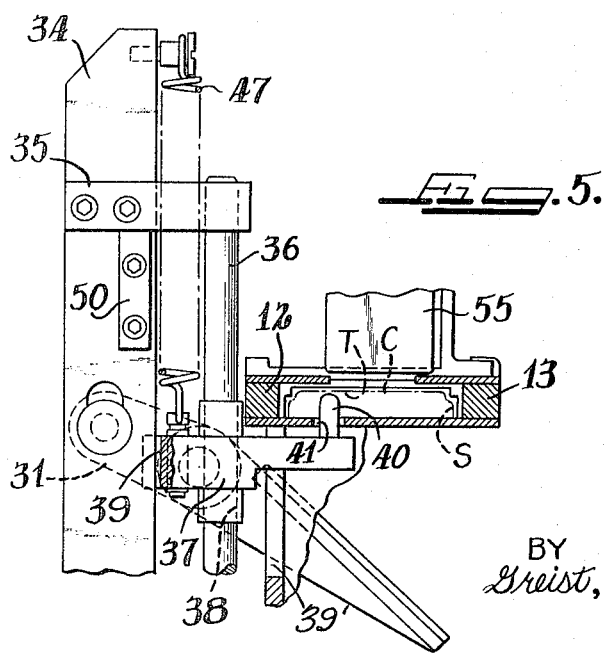
INVENTORS
CARL HAUSEN
ROBERT A. JOHNSON
BY
Greist, Lockwood, Greenawalt & Dewey
Attys.

United States Patent Office 3,310,142
Patented Mar. 21, 1967

3,310,142
AUTOMATIC CAP EJECTOR
Carl Hausen, Barrington, and Robert A. Johnson, Park Ridge, Ill., assignors to Continental Can Company, Inc., New York, N.Y., a corporation of New York
Filed Oct. 22, 1965, Ser. No. 500,586
12 Claims. (Cl. 193—31)

This invention relates to the handling of closure members for receptacles and is more particularly concerned with improvements in apparatus for detecting and removing from a feed line jar caps or similar closure members which are undesirable because of defects or improper orientation in the line.

In the handling of closures for jars, bottles and similar receptacles, such as, in a jar filling and closing operation, it is desirable to maintain a steady supply of closure caps for application to the jars with the caps properly oriented, that is, facing in the right direction for application to the mouth of the jar by the capping machine and also to eliminate from the supply line damaged or oversize caps which might result in an improper closure, or even breakage, with a resultant interruption of the capping operation. Therefore, it is an object of the present invention to provide apparatus for incorporation in a cap feed chute which will allow caps which are in proper condition for application to the receptacles to proceed through the chute and which will detect and eliminate caps which are improperly oriented or which are damaged or defective so that they will not pass through a gauging device incorporated in the chute.

It is a more specific object of the invention to provide in a cap transporting guideway or chute a gauge device which will permit caps in properly oriented and acceptable condition to advance through the chute and which will stop improperly oriented and/or damaged caps, and associated mechanism which will open a trap door to discharge a cap which has been stopped and automatically close thereafter to permit the flow of caps to be resumed so that any improperly oriented or damaged caps are automatically ejected from the chute with a minimum of interruption in the flow of caps through the chute.

It is another object of the invention to provide an apparatus for incorporation in a cap transporting chute which comprises a gauge forming device operative to stop any cap presented thereto which is improperly oriented or which has a defect preventing it from going through the gauge, with the gauge being disposed opposite a trap door in the chute through which a stopped cap is adapted to be ejected from the chute and associated sensing devices located on opposite sides of the gauge and spaced along the path of the caps for automatically controlling the opening and closing of the trap door, which sensing devices are activated by the presence or absence of caps in the portions of the chute where the sensing devices are located.

These and other objects and advantages of the invention will be apparent from a consideration of the cap transporting chute and associated apparatus which is shown by way of illustration in the accompanying drawings wherein:

FIGURE 1 is a plan view of a portion of a cap transporting chute having incorporated therein cap gauging and ejecting mechanism which embodies the principal features of the invention;

FIGURE 2 is a side elevation of the apparatus shown in FIGURE 1;

FIGURE 3 is a cross section taken on the line 3—3 of FIGURE 1;

FIGURE 4 is a cross section taken on the line 4—4 of FIGURE 1, to an enlarged scale;

FIGURE 5 is a cross section taken on the line 5—5 of FIGURE 3, with portions broken away and with the cap ejector gate in open position; and FIGURE 6 is a schematic diagram showing the electrical control system.

In the form of the apparatus shown in the drawings, the caps C which are being handled are of the type having a top panel T (FIGURES 1, 2, 4 and 5) and a depending skirt S, with the top panel T of smaller diameter than the diameter at the base of the skirt S and the latter being divided into a cylindrical bottom or base section of predetermined diameter and a cylindrical section adjacent the top panel T of substantially smaller diameter so that the outline of a diametrical cross section of the cap when it is in a position with the top panel uppermost differs from the outline thereof when it is in the inverted position and a gauge of proper design when positioned in the chute 10 will distinguish between the two positions of the cap, allowing a cap in upright position to pass through the same and stopping a cap which is in inverted or upside down position.

The chute 10 is designed with a rectangular cross section which will normally accommodate the cap C in either properly oriented, upright position or in upside down position. It is also of a size that it will accommodate caps which are somewhat oversized or which may be damaged by twisting or the like through handling. The chute 10 comprises a bottom plate 11, spaced side wall forming members or rails 12 and 13, and two top guide members or plates 14 and 15 which are in a common plane with their inner edges spaced so as to permit the flow of caps to be observed. The chute 10 provides a passageway 16 of rectangular cross section for accommodating the caps C. The chute 10 is supported on post 17 or any other suitable support, preferably in a downwardly inclined position to enable the caps to advance or flow downwardly in the chute by gravity.

A gauge device 18 is incorporated in the chute 10, as shown in FIGURES 1, 2 and 4, which has a generally U-shaped cross section with a top forming panel 19 and side wall forming panels 20 and 21 with the latter having the inside edges 22 and 23 in confronting, parallel, spaced relation, at opposite sides of the chute 10 and shaped so as to permit free passage of a cap C which is advancing in the chute with its top panel T uppermost and which is in proper condition for application to a container, that is, it is the proper size, within predetermined tolerances, and it is not twisted or otherwise damaged so that it will not pass between the two gauge walls 22 and 23. An upside down cap or a cap having a defect or damage which will prevent it from passing through the gauge 18 will be stopped by the gauge at the entrance to the same or at a point only partially through the gauge. The gauge 18 is supported in the chute 10 by a bracket forming cross bar 24 to which it is secured by bolt 25. The cross bar 24 is bolted or otherwise secured to the chute side rail members 12 and 13.

The gauge 18 is located with its downwardly opening bottom face opposite a hinged section 26 of the bottom panel 11 of the chute. The hinged section 26 forms a trap door in the bottom plate 11. It is mounted at one side of the chute on a hinge pin 27 by means of pin carrying ears 28 and 28' extending laterally of the section 26. The hinge pin 27 is journaled at its ends in bearing brackets 30 and 30' which extend laterally of the side wall 12 of the chute 10 as shown in FIGURES 1 and 2. At one end, the pin 27 has a radially extending lever arm 31 and at its end a short pin 32 is mounted so as to extend through a relatively short elongate slot 33 intermediate the top and bottom ends of a reciprocable bar member 34. A pair of brackets 35 and 35' are spaced lengthwise of the bar 34 and support a guide rod 36 extending parallel with the long axis of the bar 34. A bracket 37 having a bore 38 is slidingly mounted on the guide rod 36 with one end bifurcated and forming a track 39 which receives in sliding relation the edge of the bar 34 so as to guide the bracket 37 for reciprocating movement on the guide rod 36. The bracket 37 extends through a vertical slot 39' in the post 17 so that its other end is beneath the bottom plate 11 of chute 10 and carries stop pin 40. The pin 40 is located so as to align with an aperture 41 in the bottom plate 11 and serves to stop the the flow of caps when moved into the aperture 41 so as to project into the path of the caps. The bar 34 is connected by pivot 42 to a clevis 43 on the end of the piston 44 of an air motor 45 which is supported on a bracket 46 extending from the post 17. A tension spring 47 is connected at one end by a pin 48 to the top end of the bar 34 and at its other end by the pin 49 to the stop pin bracket 37 so as to normally hold the bracket 37 against one end of a stop plate 50 on the bar 34 as shown in FIGURE 3. The trap door 26 is closed when the bar 34 is in the retracted position shown in FIGURE 3 and the stop pin 40 is in inoperative position so that the caps are free to move through the gauge 18.

Cap sensing devices 55 and 56 are mounted by means of brackets 57 and 58 above the top face of the chute 10 in longitudinally spaced relation adjacent the gauge 18. The sensing device 55 is located upstream of the gauge 18 and the sensing device 56 is located downstream of the gauge 18. The sensing devices or sensors 55 and 56 are each spaced somewhat from the end of the trap door 26 and each such device is operative to sense the presence of a cap in the chute 10 opposite the probe forming end of the sensor so as to control the opening and closing of the trap door 26 in accordance with the presence or absence of caps in the chute 10 immediately adjacent the gauge 18. The sensors 55 and 56 are connected into an electrical control circuit as shown in FIGURE 6 so that they form part of a time delay proximity switch system which includes a timing device 60 and suitable amplifiers 61 and 62 for the sensors. A valve unit or assembly 63 (FIGURE 3) controls the air motor 45 which includes a pilot valve 64 controlled by a solenoid 65, the solenoid coil 66 being in the control circuit as indicated in the circuit diagram of FIGURE 6. A suitable air motor assembly which includes a solenoid controlled pilot valve may be obtained from The Bellows Co. of Akron, Ohio, the unit being described in Bulletin BM–25R and identified as No. BNSAPVM–IC–20.

The sensors 55 and 56 are a type which are available commercially from Micro Switch Division of Minneapolis Honeywell Regulator Co. and are identified by No. 4FB1 for detecting ferrous metal objects and by No. 6FS1 for detecting non-ferrous metal objects. Amplifiers for use with these sensors are available also from the same manufacturer and are identified by No. 20FC–1 for use with sensor No. 4FB1 and No. 20FL–1 for use with sensor No. 6FS1. The sensors 55 and 56 act as switches which operate, that is, open and close the control circuit, in accordance with the presence or absence of a cap in the sensing field. In the arrangement shown, cap flow continues so long as all the caps pass through the gauge 18. When a damaged or oversize cap or an upside down cap appears in the chute 10 and is stopped by the gauge 18 the cap flow at the downstream sensor 56 is interrupted, assuming the caps which have already passed the gauge 18 continue to advance downstream and past the sensor 56. The sensor 56 will operate the air motor 45 to move the bar 34 and open the gate or strap door 26 so as to discharge the defective cap which has been stopped. One signal from the sensors actuates the air motor 45 for a complete cycle, that is, the return stroke of the piston 44 is automatic under the control of the valve unit 63. The return stroke may be slowed down to insure that the trap door or gate 26 is open a sufficient length of time to insure proper ejection of the unacceptable cap. The speed of the return stroke may be controlled, for example, by a throttle valve which meters the rate of exhaust. The stop pin 40 is moved into operative position before the gate 26 opens, due to the lost motion connection provided by pin 32 and slot 33, so as to stop the flow of caps upstream of the gauge 18. On the return stroke of the bar 34 the gate 26 will close first and the stop pin 40 will be retracted last allowing flow of caps to be resumed. The sensors 55 and 56 with the timer 60 are interlocked in the system so that the gate 26 will open only when a cap is stopped by the gauge 18 for the duration of the time delay interval set on the timer 60 and there are no caps present at the downstream sensor 56. The gate 26 remains closed for any other combination of cap flow conditions, that is, when there is a cap at downstream sensor 56, the latter acts as an open switch and when a cap is not present it acts as a closed switch in the control circuit. The upstream sensor 55 acts as an open switch when there is no cap and as a closed switch when there is a cap in the chute and the gate 26 opens only when both sensors act as closed switches. When there is no cap at downstream sensor 56 there must be a cap at the upstream sensor 55 to open the gate. If there is no cap at the upstream sensor 55, the gate 26 will remain closed. If there is a cap at the downstream sensor 56 the gate 26 will remain closed. This provides for automatic ejection of caps determined by gauge 18 to be unacceptable while acceptable caps continue to flow through the chute. The timer 60 provides for a sufficient delay in the opening of the gate 26 to prevent operation being triggered by spacing of the caps during flow which may occur due to random delivery from a supply hopper or when starting with an empty chute. The gate 26 is held open long enough to eject the unacceptable cap and frequently the next succeeding one or two caps will be ejected depending upon how close they are following the cap which is stopped by the gauge and also depending upon how far the unacceptable cap has advanced into the gauge.

The operation of the apparatus will be understood from the foregoing description. So long as caps are advanced beyond the downstream sensor 56 and a supply of caps is fed to the sensing area for the upstream sensor 55 the apparatus will operate automatically to eliminate caps which are unacceptable, as determined by the gauge 18, while the flow of caps which are acceptable will be maintained.

Other cap sensing devices may be employed which will function in the same manner to open and close a suitable control circuit. For example, an electric eye arrangement could be employed when handling caps which are fabricated of plastic or other non-metal materials. Also, another form of gauge may be used of a type which will allow caps in acceptable condition to pass while stopping unacceptable caps so that they may be removed through the trap door 26 to clear the chute for advance of subsequent caps.

While particular materials and specific structural details are referred to in describing the illustrated form of the apparatus, it will be understood that other materials and equivalent structural details may be resorted to within the spirit of the invention.

We claim:

1. Apparatus for conveying closure caps for containers comprising a chute forming a guideway of generally rectangular cross section for accommodating the caps in single file, skirt abutting relation, a cap gauge having an open side facing the bottom of the chute and constructed with a passageway through which the caps in predetermined acceptable condition will pass while unacceptable caps will be stopped in the chute, said chute having a movable bottom section forming a cap discharge gate member which is located opposite the open side of said gauge member, means mounting said gate member for swinging movement so as to open the bottom of the chute for discharge of a cap stopped by said gauge member, a pair of switch forming devices mounted adjacent the leading and trailing sides of the gauge member which are actuated by the presence or absence of caps in the chute at the leading and trailing sides of said cap gauge member, power means connected to said gate member for swinging said gate member between open and closed positions and means responsive to operation of said switch forming devices for controlling the operation of said power means so as to automatically discharge unacceptable caps.

2. Apparatus for conveying closure caps for containers comprising a chute forming a guideway of generally rectangular cross section in which the caps are free to advance by gravity in single file, skirt abutting relation, a cap gauge having an open side facing the bottom of the chute and a passageway through which the caps in predetermined acceptable condition will pass while unacceptable caps will be stopped in the chute, a gate forming member in the bottom of the chute which is located opposite said gauge member, means mounting said gate member for swinging movement so as to open the same for discharge of a cap stopped by said gauge member, a pair of switch forming devices mounted adjacent the entrance and discharge sides of the gauge member which are actuated by the presence or absence of caps in the chute adjacent the same, power means connected to said gate member for swinging said gate member between open and closed position and means responsive to operation of said switch forming devices for controlling the operation of said power means.

3. Apparatus for handling closure caps for jars or like containers comprising a chute having a passageway for accommodating caps arranged in single file and skirt abutting relation, a cap gauge mounted in said chute which is constructed so as to pass caps arranged in predetermined relation and in predetermined condition but to stop caps in any other relation or condition, said gauge having an open bottom face and means for mounting said gauge in predetermined position in said chute with the open face opposite a hingedly mounted section of the bottom of said chute, power means for opening and closing said hingedly mounted section to discharge a cap stopped at said gauge, a pair of sensing devices arranged in spaced relation along the chute at opposite ends of said gate which devices sense the presence or absence of caps at predetermined locations in the chute relative to said gauge, and means connecting said sensing devices with said power means so as to automatically open and thereafter close said hingedly mounted section when a cap is stopped by said gauge and the preceding caps in the chute advance so as to empty the chute at the location of the sensing device downstream of the gauge.

4. Apparatus for handling closure caps for containers comprising a chute having a passageway for accommodating caps arranged in single file and skirt abutting relation, a cap gauge mounted in said chute which is constructed to pass caps in predetermined condition and arranged in predetermined orientation but to stop all other caps, said gauge having an open bottom face and means for mounting said gauge in predetermined position in said chute, said chute having an opening in the bottom opposite said gauge, a movable closure for said opening, means for moving said closure to permit discharge through said opening of a cap stopped at said gauge, a pair of cap sensing devices arranged in spaced relation along the chute adjacent the entrance and discharge ends of said gauge, and electrical means interconnecting said sensing devices and said means for moving said closure whereby to automatically discharge a cap which is stopped by said gauge while the caps in the chute that have passed through the gauge are moving ahead in the chute.

5. Apparatus for conveying closure caps for containers comprising a chute forming a guideway having a cross section for accommodating the caps in single file, skirt abutting relation, a cap gauge having an open side facing in a downward direction toward the bottom of the chute and constructed with a passageway through which the caps in predetermined acceptable condition will pass while unacceptable caps will be stopped in the chute, said chute having a movable bottom section forming a cap discharge gate member which is located opposite the entrance end of said gauge member, means mounting said gate member for movement to an open position for discharge from the chute of a cap stopped by said gauge member, a pair of switch forming devices mounted adjacent the leading and trailing sides of the gauge member which are actuated according to the presence or absence of caps in the chute opposite said devices, power means connected to said gate member for moving said gate member between open and closed position and means responsive to operation of said switch devices for controlling the operation of said power means so as to automatically discharge caps stopped by said gauge member.

6. Apparatus for handling closure caps for containers comprising a chute having a downwardly inclined passageway for accommodating caps arranged in single file and skirt abutting relation, a cap gauge mounted in said chute which is constructed to pass caps in predetermined condition and arranged in predetermined orientation but to stop caps which are not in said condition and orientation, said gauge having an open bottom face, means for mounting said gauge in predetermined position in said chute, said chute having a gate forming removable bottom section opposite said gauge, means for opening and closing said chute section whereby to permit discharge of a cap stopped at said gauge, a pair of cap sensing devices arranged in spaced relation along the chute upstream and downstream, respectively, of said gauge, and electrical means interconnecting said cap sensing devices, said electrical means operating to automatically open and close said chute section when a cap is stopped by said gauge and the caps in the chute downstream of the gauge move ahead so as to empty the chute at the downstream sensing device.

7. Apparatus for handling closure caps as recited in claim 6, and means mounted for movement into the chute at the upstream sensing device to stop the flow of caps when the gate forming bottom chute section is opened.

8. Apparatus for handling closure caps for containers comprising a chute having a pasageway of generally rectangular cross section for advancing caps arranged in single file and skirt abutting relation, a cap gauge mounted in said chute which is constructed to pass caps in predetermined condition and arranged in predetermined orientation only, caps in any other condition or arrangement being stopped by the gauge, said gauge having an open lower face and means for mounting said gauge in predetermined position in said chute, said chute having an aperture in said passageway opposite the open lower face of said gauge, means for opening and closing said aperture to permit discharge of a cap stopped at said gauge, cap sensing devices arranged in spaced relation along the chute upstream and downstream of said gauge and electrical means interconnecting said sensing devices and said means for opening and closing said aperture so as to automatically eject through said aperture a cap stopped by said gauge when the caps in the chute downstream of the gauge move ahead so as to empty the chute at the downstream sensing device.

9. Apparatus for handling closure caps for containers comprising an inclined chute having a passageway for advancing by gravity caps arranged in single file and skirt abutting relation in said passageway, a cap gauge mounted in said passageway which is constructed to pass caps in predetermined condition and arranged in predetermined orientation and to stop caps in improper condition and orientation, said gauge having an open bottom face, said chute having a gate forming bottom section opposite said gauge which is mounted to swing on an axis parallel with the axis of said chute, a lever extending from said hinged chute section, a reciprocable slide bar having a lost motion connection with said lever for opening and closing said chute section, a fluid motor for reciprocating said slide bar, an electromagnetic valve for controlling the operation of said motor, a stop member moved by said slide bar into and out of the path of the caps upstream of said hinged chute section, cap sensing devices aranged in spaced relation along the chute adjacent the upstream entrance and the downstream discharge end of said gauge, and electrical means interconnecting said sensing devices and said valve electromagnet whereby to automatically open said hinged chute section when a cap is stopped by said gauge and the caps in the chute that have passed through the gauge move ahead so as to empty the chute at the downstream sensing device.

10. Apparatus for conveying closure caps for containers comprising a chute forming a guideway of generally rectangular cross section in which the caps are free to advance by gravity in single file, skirt abuttting relation, a cap gauging device open on its bottom side and having a passage way through which the caps in predetermined acceptable. condition will pass while unacceptable caps will be stopped at the entrance where they are free to drop through the open bottom side, said gauge being mounted in the guideway with the open bottom facing a gate forming member in the bottom of the chute, means mounting said gate member for movement so as to open the same for discharge of a cap stopped by said gauge member, a pair of spaced switch devices mounted adjacent the entrance and discharge sides of the gauge passageway which are actuated in accordance with the presence or absence of caps in the chute adjacent the same, and means connected to said gate member for moving said gate member between open and closed position and means controlled by said switch devices for operating said gate moving means.

11. Apparatus as recited in claim 10 and movable stop means associated with said means for moving said gate member which stop means is projected into the path of the caps in said chute to interrupt the flow of caps to said gauge member when said gate member is opened.

12. Apparatus for handling closure caps for containers which are characterized by a top panel and a depending skirt, said apparatus comprising means forming a chute having a passageway through which caps will advance which are arranged in single file and skirt abutting relation, a cap gauge mounted in said chute which is constructed to accept and pass caps which are in predetermined condition and arranged with the top panel uppermost in the chute but which will stop caps in unacceptable condition or in upside down position, said gauge having an open bottom face, means for mounting said gauge in predetermined position in said chute with the chute having a movable bottom section opposite the bottom face of said gauge, means for opening and closing said chute section to discharge a cap stopped at said gauge, cap sensing devices arranged in spaced relation along the chute adjacent the entrance and discharge ends of said cap gauge, and electrical means interconnecting said sensing devices and said chute opening and closing means so as to automatically open and thereafter close said chute section when a cap is stopped by said gauge and the caps in the chute that have passed through the gauge move ahead so as to emplty the chute at the discharge end of said cap gauge.

References Cited by the Examiner
UNITED STATES PATENTS

| | | | |
|---|---|---|---|
| 1,533,523 | 4/1925 | Thoma | 193—43 |
| 2,689,647 | 9/1954 | Hofstetter et al. | 209—90 |
| 2,998,117 | 8/1961 | Newburn. | |

ANDRES H. NIELSEN, *Primary Examiner.*